US009586465B2

(12) United States Patent
Sanada et al.

(10) Patent No.: US 9,586,465 B2
(45) Date of Patent: Mar. 7, 2017

(54) CONNECTING STRUCTURE FOR WINDSHIELD GLASS AND COWL LOUVER, MOLDING FOR CONNECTING STRUCTURE FOR WINDSHIELD GLASS AND COWL LOUVER, AND COMBINATION STRUCTURE FOR CONNECTING STRUCTURE

(71) Applicant: TOYOTA JIDOSHA KABUSHIKI KAISHA, Toyota-shi, Aichi-ken (JP)

(72) Inventors: Akiyoshi Sanada, Miyoshi (JP); Koji Usui, Nagoya (JP); Eiji Nishikawa, Toyota (JP); Yasuhiko Fukuzumi, Nagoya (JP); Kentaro Nakashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/910,210

(22) PCT Filed: Sep. 3, 2014

(86) PCT No.: PCT/IB2014/001685
§ 371 (c)(1),
(2) Date: Feb. 4, 2016

(87) PCT Pub. No.: WO2015/033202
PCT Pub. Date: Mar. 12, 2015

(65) Prior Publication Data
US 2016/0176276 A1    Jun. 23, 2016

(30) Foreign Application Priority Data

Sep. 5, 2013 (JP) .................................. 2013-184040

(51) Int. Cl.
B60J 10/02 (2006.01)
B60J 1/02 (2006.01)

(52) U.S. Cl.
CPC ............... *B60J 10/70* (2016.02); *B60J 1/02* (2013.01); *B60J 10/30* (2016.02); *B60J 10/33* (2016.02)

(58) Field of Classification Search
CPC ............................................... B60J 7/10
(Continued)

(56) References Cited

U.S. PATENT DOCUMENTS

2003/0057660 A1    3/2003 Ortmuller et al.
2011/0115261 A1    5/2011 Platt et al.
(Continued)

FOREIGN PATENT DOCUMENTS

DE    20 2008 009 712 U1    11/2008
DE    10 2011 056 955 A1    6/2013
(Continued)

*Primary Examiner* — Dennis H Pedder
(74) *Attorney, Agent, or Firm* — Oliff PLC

(57) ABSTRACT

A connecting structure includes: a molding having a fixed portion that is fixed on an inner surface of a lower edge of a windshield glass, and a fitting portion that receives an engagement rib that protrudes downward from a location near an upper edge of a cowl louver, wherein the engagement rib and the fitting portion include slip-out prevention projections that prevent the engagement rib from slipping out. On both sides of the engagement rib are provided elastic lips and that are supported by the fitting portion, and these elastic lips extend in the extending direction of the engagement rib and press on the engagement rib at a side closer to a tip of the engagement rib than the slip-out prevention projections, these elastic lips press each other in opposite directions.

15 Claims, 3 Drawing Sheets

(58) Field of Classification Search
USPC .............................................. 296/96.21, 192
See application file for complete search history.

(56) References Cited

U.S. PATENT DOCUMENTS

2012/0126567 A1   5/2012  Timmermann
2014/0327267 A1  11/2014  Deussen et al.

FOREIGN PATENT DOCUMENTS

| EP | 2370282      | * | 7/2009  |
|----|--------------|---|---------|
| JP | 2003-532574 A |   | 11/2003 |
| JP | 2010-184618 A |   | 8/2010  |
| JP | 2011-126455 A |   | 6/2011  |
| JP | 2011-520694 A |   | 7/2011  |
| JP | 2012-240454 A |   | 12/2012 |
| JP | 2013-501672 A |   | 1/2013  |

* cited by examiner

CONNECTING STRUCTURE FOR WINDSHIELD GLASS AND COWL LOUVER, MOLDING FOR CONNECTING STRUCTURE FOR WINDSHIELD GLASS AND COWL LOUVER, AND COMBINATION STRUCTURE FOR CONNECTING STRUCTURE

BACKGROUND OF THE INVENTION

1. Field of the Invention

The present invention relates to a windshield glass and a cowl louver for a vehicle such as an automobile, and more particularly to a connecting structure therefor.

2. Description of Related Art

In a vehicle such as an automobile, a windshield glass and a cowl louver located toward the vehicle front side are connected by a molding interposed therebetween. The cowl louver has, near an upper edge thereof, an engagement rib that protrudes inward of the vehicle and extends along the upper edge, and the molding has a fixed portion that is fixed to an inner surface of a lower edge of the windshield glass and a fitting portion that receives the engagement rib.

A pair of engagement claws that protrudes in a direction away from each other are provided at the tip of the engagement rib on both sides thereof in a width direction thereof, and a pair of engagement projections that cooperates with corresponding engagement claws is provided on an inner surface of the fitting portion. When the engagement rib is fit into the fitting portion up to a predetermined position, the cowl louver is connected to the windshield glass in a predetermined positional relationship with respect to the windshield glass by a molding. Further, the respective engagement protrusions are engaged with corresponding engagement claws, thereby preventing the engagement rib from slipping out from the fitting portion.

For example, Published Japanese Translation of PCT application No. 2011-520694 (JP 2011-520694 A) described below discloses a connecting structure between a windshield glass and a water tank, the water tank corresponding to a cowl louver, in which one of the engagement projections is replaced by an elastically deformable engagement member that is fixed to the inner surface of the fitting portion. According to this connecting structure, since engagement means for cooperating with one of the engagement claws is an elastically deformable member, the engagement rib can be fit into the fitting portion more easily as compared to a case where both engagement means such as the projections are a part of the fitting portion and less elastically deformable than the engagement members.

The connecting structure of the related art includes a sealing member interposed between the lower edge end of the windshield glass and the upper edge of the cowl louver (water tank) such that the entry of rain between the cowl louver and the molding is prevented by the sealing member. Accordingly, the engagement claws provided at the tip of the engagement rib and the engagement projections cooperating therewith are not intended to exert a water preventive effect of preventing the entry of water via the clearance between the engagement rib and the engagement projections.

Accordingly, due to dimensional and geometrical tolerances of manufacture and assembly of each member and due to geometrical and dimensional changes of each member over time, a clearance may form between the sealing member and the upper edge of the cowl louver, which may lead to entry of water between the cowl louver and the molding. Consequently, the connecting structure of the related art for connecting the windshield glass and the cowl louver requires some improvement in terms of effectively preventing entry of water into vehicle interior.

SUMMARY OF THE INVENTION

According to the present invention, the connecting structure between the windshield glass and the cowl louver effectively prevents the entry of water into vehicle interior via the clearance between the cowl louver and the molding, regardless of the dimensional and geometrical tolerances of manufacture and assembly of each member which constitutes the connecting structure and geometrical and dimensional changes of each member over time.

According to one aspect of the present invention, the invention provides a connecting structure for a windshield glass and a cowl louver, including: a molding having a fixed portion that is fixed on an inner surface of a lower edge of the windshield glass, and a fitting portion that receives an engagement rib that protrudes downward from a location near an upper edge of the cowl louver and that extends along the upper edge, in which the engagement ribs and the fitting portion include slip-out prevention projections that prevents slipping out of the engagement rib from the fitting portion by cooperation of the slip-out prevention projections. The invention also provides a molding for the connecting structure for a windshield glass and a cowl louver, including: a fixed portion that is fixed on an inner surface of a lower edge of the windshield glass; and a fitting portion that receives an engagement rib that protrudes downward from a location near an upper edge of the cowl louver and that extends along the upper edge; in which the engagement rib and the fitting portion include slip-out prevention projections that prevent slipping out of the engagement rib from the fitting portion by cooperation of the slip-out prevention projections. The invention also provides a combination structure of a windshield glass and a molding for a connecting structure for a windshield glass and a cowl louver, in which the molding is fixed at a fixed portion on an inner surface of a lower edge of the windshield glass, the molding is provided with a fitting portion that receives an engagement rib that protrudes downward from a location near an upper edge of the cowl louver and that extends along the upper edge, and the engagement rib and the fitting portion are provided with or include slip-out prevention projections that prevent slipping out of the engagement rib from the fitting portion by cooperation of the engagement rib and the fitting portion, and preferably, by cooperation of the slip-out prevention projections thereof.

In any of the above-described connecting structure, molding, and the combination structure of the molding and the windshield glass, the molding is provided with a first and a second elastic lips. The first elastic lip is supported by the fitting portion on the windshield glass side with respect to the engagement rib, and the second elastic lip is supported by the fitting portion on the opposite side of the first elastic lip with respect to the engagement rib. The first and the second elastic lips press on the engagement rib at a side closer to the tip of the engagement rib than the slip-out prevention projections, and the first and the second elastic lips press each other in opposite directions.

Therefore, according to the above-described structure, even if water enters the fitting portion of the molding via a clearance between the windshield glass and the cowl louver, the first elastic lip prevents that water from entering inside the fitting portion via a clearance between the engagement rib and the first elastic lip. Also, even if water enters inside the fitting portion via the clearance between the engagement rib and the first elastic lip, the second elastic lip prevents that water from entering further inside the fitting portion via the clearance between the engagement rib and the second elastic lip.

Further, the first and the second elastic lips elastically press on the engagement rib in opposite directions. Therefore, even if dimensional and geometrical tolerances from manufacture and assembly of each member of the connecting structure exist, and even if the geometry and dimensions of each member changes over time, the first and the second elastic lips will maintain the state where they are in close contact with the engagement rib, whereby exerting the water preventive function by preventing the entry of water via the clearance between the first and the second elastic lips. Therefore, entry of water to vehicle interior can be prevented by two elastic lips.

Also, the first and the second elastic lips press on the engagement rib in opposite directions at a side closer to the tip of the engagement rib than the slip-out prevention projections of the engagement rib and the fitting portion. Accordingly, the slip-out prevention projections of the engagement rib and the fitting portion are not expected to possess the water preventive function, and the slip-out prevention projections only need to serve the function of preventing slipping out of the engagement rib from the fitting portion.

Further, the first and the second elastic lips do not engage with the slip-out prevention projections of the engagement rib and the fitting portion when fitting the engagement rib into the fitting portion during assembly of the connecting structure or when pulling out the engagement rib from the fitting portion during disassembly of the connecting structure. Consequently, elasticity and rigidity of the first and the second elastic lips can be increased to enhance the water preventive function as compared to the case where the first and the second elastic lips engage with the slip-out prevention projections and go through an excessive elastic deformation. Also, deterioration of such water preventive function and durability due to elastic deformation of the first and the second elastic lips in excess can be avoided.

Also, in the above-mentioned connecting structure, a reference direction is a direction perpendicular to the protrusion direction and the extending direction of the engagement rib, the sum of the lengths of the first and the second elastic lips protruding from the inner surfaces of the fitting portion in the reference direction may be greater than a value obtained by subtracting a thickness of the engagement rib in the reference direction from a distance between the inner surfaces of the fitting portion in the reference direction in the free state before the engagement rib is fit into the fitting portion.

According to the above-described structure, the first and second elastic lips are compressed in the reference direction to be elastically deformed, which surely ensures the state where the first and second elastic lips press on the engagement rib due to a reaction force of the elastic deformation.

Further, according to the above-mentioned structure, in a sectional view taken along a longitudinal direction of a vehicle, the cowl louver is relatively pivotable, with respect to the molding, about a pivoting point that is located at a part where the slip-out prevention projections of the engagement rib and the fitting portion are engaged with each other. A reference point is a foot of a perpendicular drawn from the pivoting point to a centerline of the engagement rib, a first distance and a second distance are distances from the reference point to positions where the first and second elastic lips press on the engagement rib, the first distance and the second distance are expressed in terms of a distance in a protruding direction of the engagement rib. Pressing forces of the first and second elastic lips pressing on the engagement rib are represented by a first pressing force and a second pressing force, and a ratio of the first pressing force to the second pressing force may be greater than the ratio of the second distance to the first distance.

Suppose that moments that act on the molding about the reference point by the first pressing force and the second pressing force are the first and the second moments, respectively. The first moment acts in the direction pushing the upper edge of the cowl louver toward the windshield glass, and the second moment acts in the opposite direction as the first moment. In the case where the ratio of the first pressing force against the second pressing force is greater than the ratio of a distance $Ly2$ against a distance $Ly1$, the first moment will be greater than the second moment. Consequently, the upper edge of the cowl louver can be surely pushed toward the windshield glass by pressing forces of the first and second elastic lips.

Also, in the above-mentioned connecting structure, the slip-out prevention projections of the engagement rib and the fitting portion may be provided on the windshield glass side with respect to the engagement rib.

According to the above-described structure, the slip-out prevention projections of the engagement rib and fitting portion press each other by the pushing force applied on the cowl louver toward the windshield glass. Accordingly, even in a case where the distance between the engagement rib and the fitting portion is quite apart due to dimensional and geometrical tolerances of each member, the slip-out prevention projections of the engagement rib and the fitting portion maintain the state of being engaged with each other, therefore effectively preventing the engagement rib from slipping out of the fitting portion.

Further, the slip-out prevention projections of the engagement rib and the fitting portion do not have to be provided on the opposite side of the windshield glass with respect to the engagement rib. Consequently, the connecting structure may be simplified as compared to the case where the slip-out prevention projections of the engagement rib and the fitting portion are provided on both sides of the engagement rib, and, the fitting of the engagement rib into the fitting portion during assembly and pulling out of the engagement rib from the fitting portion during disassembly can be performed easily.

Further, according to the above-mentioned connecting structure, the position where the first elastic lip presses on the engagement rib may be a side closer to the tip of the engagement rib than the position where the second elastic lip presses on the engagement rib.

According to the above-described structure, since the first elastic lip presses on the engagement rib at the side closer to the tip of the engagement rib than the second elastic lip, the root portion of the engagement rib is subject to a moment in the direction in which it is pushed against the windshield glass. Accordingly, the upper edge of the cowl louver is pushed against the windshield glass, whereby the possibility of a clearance spreading between the upper edge of the cowl louver and the lower edge of the windshield glass due to dimensional and geometrical tolerances and the like of the members can be reduced.

Further, in the above-mentioned connecting structure, the first and second elastic lips may extend in the extending direction of the engagement rib.

According to the above-described structure, the first and second elastic lips are in frictional engagement with the engagement rib along the extending direction of the engagement rib. Therefore, for example, once the cowl louver and the molding are connected by the engagement rib being fit into the fitting portion, relative displacement of the cowl louver and the molding can be effectively reduced even when a relative force in the lateral direction of the vehicle acts between the cowl louver and the molding.

Also, in the above-mentioned connecting structure, the engagement rib does not protrude in the direction approaching the inner surface of the fitting portion on the side closer to the tip of the engagement rib than the position where the first elastic lip press on the engagement rib, and the engagement rib does not need to protrude in the direction approaching the inner surface of the fitting portion on the side closer to the tip of the engagement rib than the position where the second elastic lip press on the engagement rib.

According to the above-described structure, when fitting the engagement rib into the fitting portion or when pulling out the engagement rib from the fitting portion, the first and second elastic lips are not forced to go through elastic deformation by the engagement rib with the force that is larger than the force in the assembled state. As a result, as compared to the case where the engagement rib has a protrusion, fitting of the engagement rib into the fitting portion during assembly and pulling out of the engagement rib from the fitting portion during disassembly can be performed easily. Also, the possibility of decreasing the pressing force of the first and second elastic lips and deteriorating durability of the first and second elastic lips due to excessive elastic deformation of the first and second elastic lips can be reduced.

In the above-mentioned connecting structure, a thickness of the main body of the engagement rib may be constant, or it may be gradually decreased toward the tip of the main body of the engagement rib.

In the above-mentioned connecting structure, the first and the second elastic lips are integrally connected with the fitting portion at the roots thereof, respectively, and at least one of the first and the second elastic lips may be inclined toward a fitting direction of the engagement rib in the free state before the engagement rib is fit into the fitting portion.

According to the above-described structure, the engagement rib can be easily fit into the fitting portion as compared to the case where the first and the second elastic lips are not inclined or the case where the first and the second elastic lips are inclined in the opposite direction as the fitting direction of the engagement rib. Also, by simply fitting the engagement rib into the fitting portion, the first and the second elastic lips may be properly brought into a state where they press on the engagement rib and are in close contact with the engagement rib. Further, even if a force in the direction of pulling out the engagement rib from the fitting portion acts on the engagement rib, the first and second elastic lips can prevent the engagement rib from being pulled out from the fitting portion owing to the friction force with the engagement rib.

In the above-mentioned connecting structure, the molding may include an interposed portion that is interposed between the lower edge of the windshield glass and the upper edge of the cowl louver, and an opposing face of the interposed portion that opposes the cowl louver of the interposed portion is inclined toward the lower edge of the windshield glass as the opposing face approaches the outer end of the interposed portion. The upper edge of the cowl louver may include an opposing face of the cowl louver that opposes the opposing face of the interposed portion and that inclines in the same direction as the opposing face of the interposed portion, and the opposing face of the interposed portion and the opposing face of the cowl louver may overlap each other as seen from a direction perpendicular to the outer surface of the upper edge of the cowl louver.

According to the above-described structure, inside of the fitting portion is not visible even when seen in the direction perpendicular to the outer surface of the upper edge of the cowl louver. Accordingly, an estheticity of the connecting structure can be improved as compared to the case where inside the fitting portion is visible. Also, as compared to the case where the opposing faces of the interposed portion and the cowl louver are not inclined, the direction in which the opposing face of the cowl louver is pushed against the opposing face of the interposed portion by pressing forces of the first and the second elastic lips can be made close to a direction perpendicular to the opposing faces thereof. Therefore, as compared to the case where the opposing faces of the interposed portion and the cowl louver are not inclined, the possibility of a clearance spreading between the opposing faces thereof due to dimensional and geometrical tolerances and the like of the members can be effectively reduced.

Further, in the above-mentioned connecting structure, the cowl louver may include a plurality of first auxiliary ribs that extend in the longitudinal direction of the vehicle on the windshield glass side with respect to the engagement rib and that are spaced apart from each other in the lateral direction of the vehicle, and the slip-out prevention projections of the engagement rib may be provided on the first auxiliary ribs.

According to the above-described structure, the slip-out prevention projections of the engagement rib are provided on the first auxiliary ribs, and are spaced apart from each other in the lateral direction of the vehicle. Therefore, as compared to the case where the slip-out prevention projections are provided on the engagement rib and extend in the lateral direction of the vehicle, the dimensional and geometrical tolerances necessary for the slip-out prevention projections of the engagement rib can be increased.

In the above-mentioned connecting structure, the cowl louver may include a plurality of first auxiliary ribs that extend in the longitudinal direction of a vehicle on the windshield glass side with respect to the engagement rib and that are spaced apart from each other in the lateral direction of the vehicle, and the first auxiliary ribs may have a pinched and pressured portion that is pinched and pressured between the opposing face of the interposed portion and the opposing face of the cowl louver.

According to the above-described structure, the pinched and pressured portion of the first auxiliary rib is pinched and pressured between the opposing face of the interposed portion and the opposing face of the cowl louver, and the two opposing faces are spaced apart by the pinched and pressured portion. Accordingly, as compared to the case where the upper edge of the cowl louver and the molding come in direct contact, the dimensional and geometrical tolerances necessary for the upper edge of the cowl louver and the molding that come in contact thereto can be increased.

According to the above-mentioned connecting structure, the cowl louver may include a plurality of second auxiliary ribs that extend in the longitudinal direction of the vehicle on the opposite side of the windshield glass with respect to the engagement rib and that are spaced apart from each other in the lateral direction of the vehicle. The fitting portion may engage with the inner side of the cowl louver and the second auxiliary ribs at the tip portion of the fitting portion on the opposite side of the fixed portion with respect to the engagement rib.

According to the above-described structure, the fitting portion at the tip portion on the opposite side of the fixed portion with respect to the engagement rib is positioned by being engaged with the inner surface of the cowl louver and the second auxiliary ribs. As compared to the case where the tip portion of the fitting portion is not engaged with the inner surface of the cowl louver and the second auxiliary rib, the tip portion of the fitting portion can be accurately positioned with respect to the inner surface of the cowl louver and the second auxiliary rib. Therefore, the fitting portion can be accurately positioned with respect to the cowl louver and the engagement rib.

Particularly, when both the first and the second auxiliary ribs are provided, the positional relationship between the cowl louver and the molding is determined by engagement of the first and the second auxiliary ribs with the molding. Accordingly, as compared to the case where the cowl louver and the molding are engaged with each other over a wide range in the vehicle width direction without providing the first and the second auxiliary ribs, for example, positioning of the cowl louver and the molding can be tuned easily.

In the above-mentioned connecting structure, a stopper may be integrally provided on the inner surface of the cowl louver on the opposite side of the engagement rib with respect to the second auxiliary rib at a position spaced apart therefrom.

In the above-mentioned connecting structure, the interposed portion of the molding supports a cover at the tip portion thereof. The cover protrudes from the tip portion of the interposed portion toward the upper edge of the cowl louver, and extends along the entire molding width. The cover may also be in contact with the outer surface of the upper edge of the cowl louver at the tip.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Preferred embodiments and modification examples of the present invention will be explained in detail with reference to the attached drawings.

First Embodiment

Figure 1:
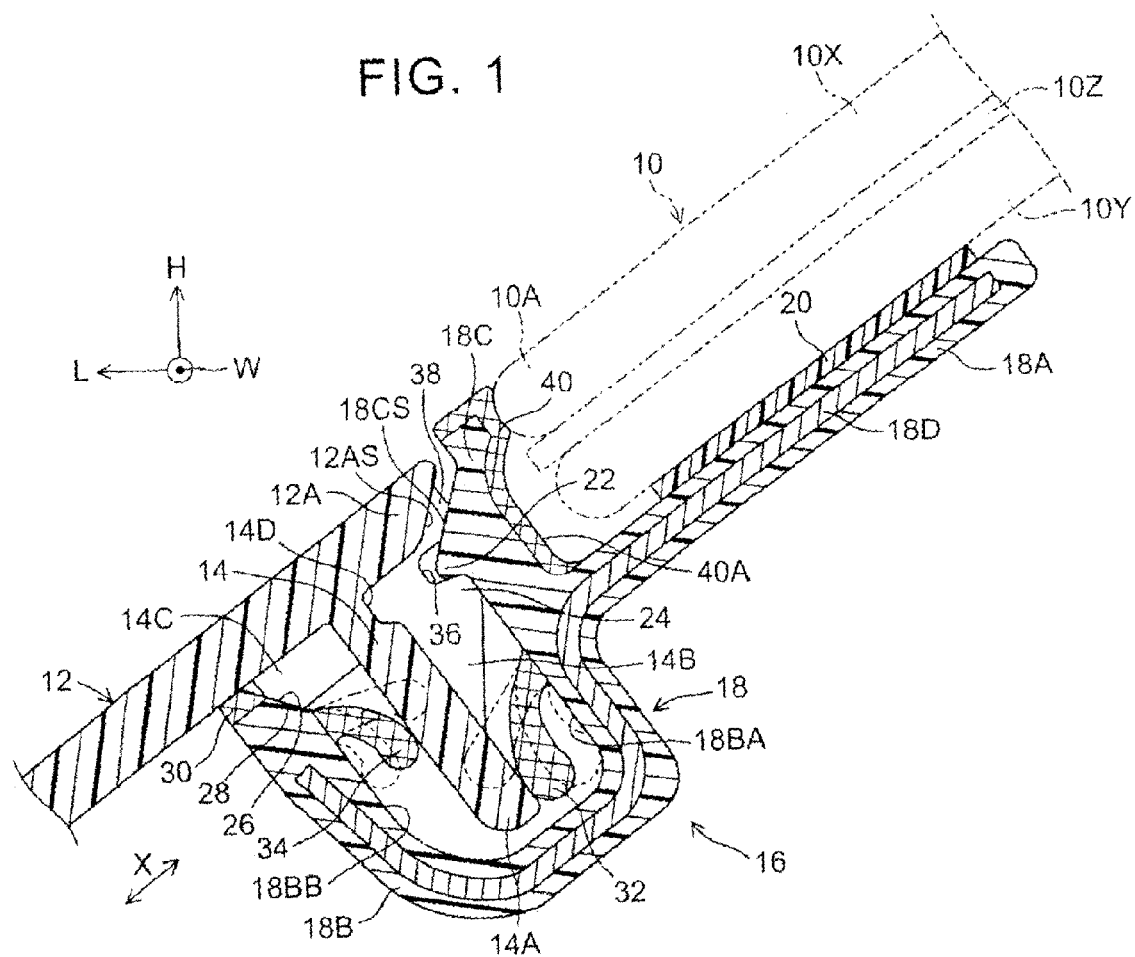
FIG. 1 is a sectional view of the connecting structure for the windshield glass and the cowl louver according to a first embodiment of the present invention, which is a vertical section along a longitudinal direction of a vehicle not shown.
Figure 2:
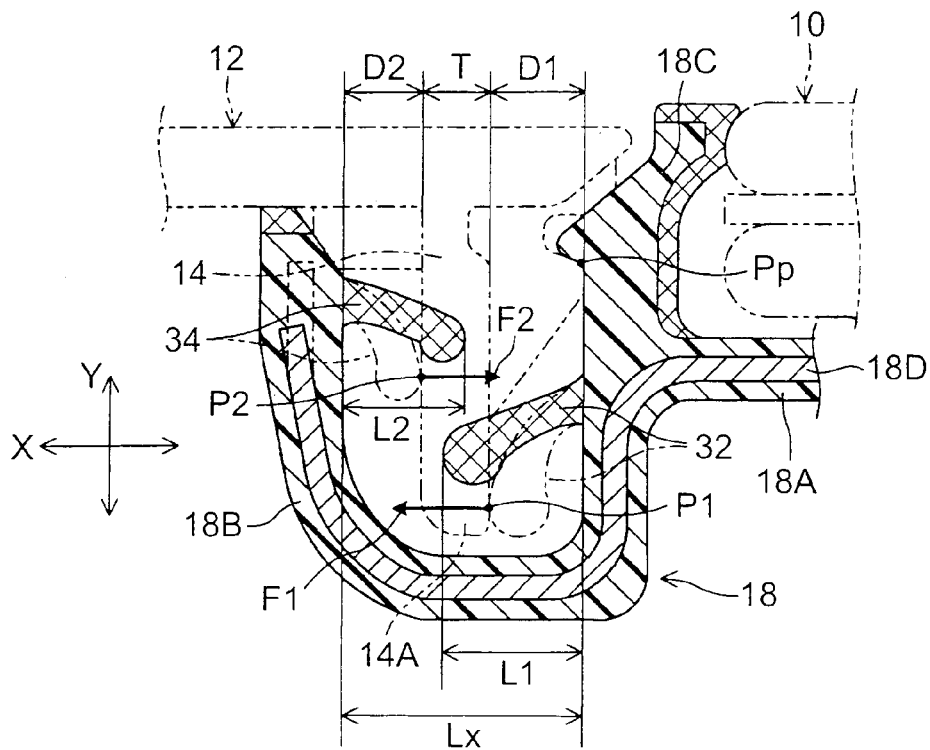
FIG. 2 is a sectional view of a molding according to the first embodiment in its free state.

FIG. 1 is a sectional view of the connecting structure for the windshield glass and the cowl louver according to a first embodiment of the present invention, which is a vertical section along a longitudinal direction of a vehicle not shown, and FIG. 2 is a sectional view of a molding according to the first embodiment in a free state. In FIG. 1, L and H respectively denote the forward- and upward-directions of the vehicle, and a transverse direction W of the vehicle denote the directions perpendicular to L and H, that is, a direction perpendicular to the paper surface of FIG. 1. The same is true for all other figures.

In FIG. 1, reference numeral 10 denotes a windshield glass of a vehicle such as an automobile, and 12 denotes a cowl louver located toward the vehicle front side with respect to the windshield glass 10. The windshield glass 10 has a three-layer structure in which an outer glass 10X, an inner glass 10Y, and a resin layer 10Z interposed therebetween are integrally joined with each other. The cowl louver 12 extends in a lateral direction of a vehicle along a lower edge 10A of the windshield glass 10. On an inner surface side of a position close to an upper edge 12A, an engagement rib 14 that protrudes perpendicularly toward the vehicle interior with respect to a panel surface of the cowl louver 12 is provided.

A connecting structure 16 for connecting the windshield glass 10 and the cowl louver 12 includes a lower edge 10A of the windshield glass 10, lower portion of the upper edge 12A of the cowl louver 12, and a molding 18 disposed therebetween. The molding 18 includes a fixed portion 18A which is to be fixed by a double-sided adhesive tape 20, for example, to an inner surface of the lower edge 10A, a fitting portion 18B that receives the engagement rib 14 of the cowl louver 12, and an interposed portion 18C that is to be interposed between the lower edge 10A and the upper edge 12A. The cowl louver 12 and the molding 18 are formed by molded resin, and an inserted body 18D made from elastically deformable metal sheet such as an aluminum sheet is embedded in the fixed portion 18A and the fitting portion 18B of the molding 18.

According to the illustrated embodiment, the engagement rib 14 includes a main body 14A that protrudes perpendicularly with respect to the panel surface of the upper edge 12A of the cowl louver 12, a first auxiliary rib 14B located on the windshield glass 10 side with respect to the main body 14A, and a second auxiliary rib 14C located on the opposite side of the first auxiliary rib 14B with respect to the main body 14A and that meshes with the first auxiliary rib 14B. The main body 14A extends in the lateral direction of the vehicle substantially across the entire width of the cowl louver 12. On the other hand, a plurality of first auxiliary ribs 14B and second auxiliary ribs 14C are provided spaced apart from each other in the lateral direction of the vehicle, respectively. Further, the first auxiliary ribs 14B and the second auxiliary ribs 14C are integrally formed with the main body 14A and the upper edge 12A, and extend along the longitudinal direction L of the vehicle.

Also, in the illustrated embodiment, A reference direction X is the direction perpendicular to the protrusion direction and the extending direction of the main body 14A, the dimensions of the main body 14A in the reference direction, that is, a thickness, is constant except for the root portion of the main body 14A. At the root portion of the main body 14A on the windshield glass 10 side, a recess 14D that extends in the lateral direction of the vehicle between the first auxiliary ribs 14B is provided. The recess 14D is provided to reduce generation of solidification shrinkage at other regions during forming of the cowl louver 12.

The fitting portion 18B has substantially U-shaped cross section with a pair of side walls located on both sides of the engagement rib 14 and a bottom wall that integrally connects the lower ends of the pair of side walls so as to receive the main body 14A of the engagement rib 14 from a distance further away than the length of the main body 14A. Further, the fitting portion 18B is engaged with an inner surface 12B of the cowl louver 12 and the second auxiliary rib 14C at the tip portion on the opposite side of the fixed portion 18A with respect to the engagement rib 14. The engagement portion between the tip portion of the fitting portion 18B and the second auxiliary rib 14C is inclined with respect to the panel surface of the cowl louver 12 and the main body 14A of the engagement rib 14

On the inner surface of the fitting portion 18B adjacent the interposed portion 18C, a projection 22 that protrudes toward the main body 14A and that extends in the lateral direction of the vehicle substantially along the entire width of the molding 18 is provided. A projection 24 that protrudes toward the windshield glass 10 at a side closer to the tip of the main body 14A than the projection 22 is provided on the first auxiliary rib 14B such that the projections 22 and 24 cooperate with each other to function as a slip-out prevention projection that controls the engagement rib 14 from slipping out from the fitting portion 18B.

The tip portion of the fitting portion 18B, that is, the end portion on the opposite side of the windshield glass 10 with respect to the engagement rib 14, has an inclined surface 26 inclined so as to face both the upper edge 12A of the cowl louver 12 and the main body 14A of the engagement rib 14, and the inclined surface 26 provided such that it comes into contact with an inclined surface 28, that is provided on the second auxiliary rib 14C of the engagement rib 14 and that is inclined in a same direction as the inclined surface 26, in a pressured state. Further, at the tip portion of the fitting portion 18B, a contact portion 30 that is integrally molded by a resin softer than the resin used for forming the molding 18 is provided. The contact portion 30 comes into contact with the inner surface of the cowl louver 12 on the side opposite of the main body 14A with respect to the second auxiliary rib 14C in a pressured state.

An inner surface 18BA of the fitting portion 18B located on the windshield glass 10 side with respect to the main body 14A of the engagement rib 14 extends substantially parallel to the surface of the main body 14A. A first elastic lip 32 that is inclined and that extends toward the tip of the main body 14A with respect to the direction perpendicular to the main body 14A is provided on the inner surface 18BA. Further, an inner surface 18BB of the fitting portion 18B located on the opposite side of the windshield glass 10 with respect to the main body 14A of the engagement rib 14 extends substantially parallel to the surface of the main body 14A expect for a region opposing the tip portion of the main body 14A. A second elastic lip 34 that is inclined and that extends toward the tip of the main body 14A with respect to the direction perpendicular to the main body 14A is provided on the inner surface 18BB.

The first elastic lip 32 and the second elastic lip 34 extend in the direction the engagement rib 14 extends, that is, in the lateral direction of the vehicle. Further, the first elastic lip 32 and the second elastic lip 34 are molded integrally with the fitting portion 18B with a same resin that is softer than the resin used for forming the molding 18, and the tip portion substantially has a semicircular cross section. In the illustrated embodiment, the first elastic lip 32 is located at a side closer to the tip of the main body 14A than the second elastic lip 34. Also, the first elastic lip 32 is thicker than the second elastic lip 34, and the radius of cross section at the tip portion of the first elastic lip 32 is also larger than that of the second elastic lip 34.

As shown in FIG. 2, the first elastic lip 32 and the second elastic lip 34 are inclined such that the tips thereof are located below the roots thereof even in their free states before the engagement rib 14 is fit into the fitting portion 18B. Lengths of the first elastic lip 32 and the second elastic lip 34 protruding from the inner surfaces 18BA and 18BB of the fitting portion 18B in the reference direction X in their free states are represented by L1 and L2, respectively. The sum of lengths L1 and L2, L1+L2, is larger than a value Lx−T obtained by subtracting the thickness T of the main body 14A of the engagement rib 14 in the reference direction from a distance Lx between the inner surfaces 18BA and 18BB of the fitting portion 18B in the reference direction X.

Also, the length L1 is greater than a distance D1 between the inner surface 18BA and the surface of the main body 14A of the engagement rib 14 in the reference direction, and the length L2 is greater than a distance D2 between the inner surface 18BB and the surface of the main body 14A of the engagement rib 14 in the reference direction. Further, a difference L1−D1 between length L1 and distance D1 is equal to or greater than a difference L2−D2 between length L2 and distance D2. Specifically, the difference L1−D1 is preferably greater than the difference L2−D2 so as to ensure that the pressing force of the first elastic lip 32 acting on the engagement rib 14 is greater than the pressing force of the second elastic lip 34 acting on the engagement rib 14.

Accordingly, when the engagement rib 14 is fit into the fitting portion 18B, the first elastic lip 32 and the second elastic lip 34 are pressed downward and at the same time are pressed toward the inner surfaces 18BA and 18BB, whereby the first elastic lip 32 and the second elastic lip 34 are elastically deformed so as to be curved downward. As a result, the first elastic lip 32 and the second elastic lip 34, with the tip portions thereof, come in close contact with the surface of the main body 14A at a side closer to the tip of the engagement rib 14 than the slip-out prevention projections 22 and 24, and at the same time press against the main body 14A in opposite directions with pressing forces F1 and F2, respectively.

As shown in FIG. 1 and FIG. 2, an opposing face 18CS of the molding 18 that opposes the cowl louver 12 is inclined toward the lower edge 10A of the windshield glass 10 as it approaches an outer end of the interposed portion 18C. The upper edge 12A of the cowl louver 12 has an opposing face 12AS that opposes the opposing face 18CS and that is inclined toward the same direction as the opposing face 18CS at substantially identical angle. The opposing face 18CS of the interposed portion 18C and the opposing face 12AS of the cowl louver 12 overlap each other as seen from a direction perpendicular to the outer surface of the upper edge of the cowl louver 12 (a direction perpendicular to the reference direction X shown in FIG. 1). At the outer end of the interposed portion 18C, the opposing face 18CS extends in the direction perpendicular to the outer surface of the upper edge 12A of the cowl louver 12.

The first auxiliary rib 14B of the engagement rib 14 has, on the outer side of the projection 24, a recess 36 that receives the projection 22 of the molding 18. Also, the first auxiliary rib 14B has, on the outer side of the recess 36, a pinched and pressured portion 38 that is pinched and pressured between the opposing face 18CS of the interposed portion 18C and the opposing face 12AS of the cowl louver 12. The pinched and pressured portion 38 extends down to the main body 14A side of the engagement rib 14 rather than at the tip of the upper edge 12A of the cowl louver 12.

The surface on the opposite side of the opposing face 18CS of the interposed portion 18C with respect to the interposed portion 18C and the surface on the outer end of the interposed portion 18C are formed by a soft layer 40 formed integrally from resin softer than the resin used for forming the molding 18. The soft layer 40 is in contact with the lower end of the outer glass 10X of the windshield glass 10 at the outer end portion of the interposed portion 18C. The outer surface of the soft layer 40 matches the surface of the outer glass 10X and the end of the soft layer 40 match the opposed surface 18CS on the cowl louver 12 sides. The soft layer 40 has, in a region opposing the lower end of the inner glass 10Y of the windshield glass 10, a recess portion 40A curved in a direction of away from the lower end. The recess portion 40A prevents the interference of the interposed portion 18C with the inner glass 10Y due to dimensional tolerance of the inner glass 10Y with respect to the outer glass 10X.

As it may be understood from the explanation above, the connecting structure 16 connects the windshield glass 10 and the cowl louver 12 as follows. First, the molding 18 is positioned with respect to the lower edge 10A of the windshield glass 10 by the fixed portion 18A and the interposed portion 18C, and the molding 18 is then fixed to the inner surface of the lower edge 10A of the inner glass 10Y at the fixed portion 18A by the double-sided adhesive tape 20, for example. Also, the molding 18 may be fixed to the lower edge 10A of the windshield glass 10 at the fixed portion 18A in advance.

Then, while turning the cowl louver 12 clockwise as seen in FIG. 1 and FIG. 2, the main body 14A of the engagement rib 14 of the cowl louver 12 is fitted into the fitting portion 18B of the molding 18. The pinched and pressured portion 38 is pinched and pressured between the opposing face 18CS of the interposed portion 18C and the opposing face 12AS of the cowl louver 12. The tip of the fitting portion 18B comes into contact with the inner surface of the cowl louver 12 and the second auxiliary rib 14C, whereby the cowl louver 12 is positioned with respect to the molding 18.

Accordingly, the connecting structure 16 including the molding 18 allows connecting of the windshield glass 10 and the cowl louver 12 in a predetermined positional relationship. Further, upon fitting of the main body 14A of the engagement rib 14 into the fitting portion 18B, the fitting portion 18B is spread by elastic deformation of the fitting portion 18B, which causes the projection 22 to move past the projection 24.

When the windshield glass 10 and the cowl louver 12 come to be in a predetermined positional relationship, the projections 22 and 24 cooperate with each other to prevent the main body 14A of the engagement rib 14 from slipping out from the fitting portion 18B. Further, the tips of the first elastic lip 32 and the second elastic lip 34 engage with the main body 14A of the engagement rib 14, and the tips press the main body 14A in opposite directions with pressing forces F1 and F2, respectively.

Further, in the case of releasing the connection between the windshield glass 10 and the cowl louver 12 to remove the cowl louver 12, turn the cowl louver 12 counterclockwise about the engagement portion of the projections 22 and 24 to push and to expand the fitting portion 18B by elastic deformation, for example. In that state, the cowl louver 12 is moved in a direction that pulls the main body 14A of the engagement rib 14 from the fitting portion 18B.

Figure 3:
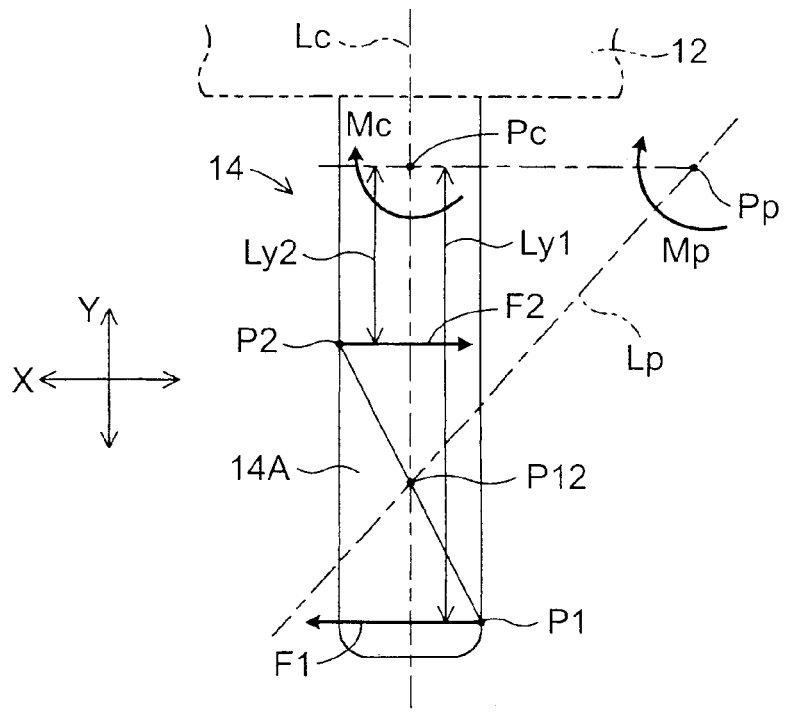
FIG. 3 is a pattern diagram for explaining force that is generated by first and second elastic lips and that acts on a main body of the engagement rib, and for explaining moment and the like generated by such force.

FIG. 3 is a pattern diagram for explaining force that is generated by the first elastic lip 32 and the second elastic lip 34 and that acts on a main body 14A of the engagement rib 14, and for explaining moment and the like generated by such force.

As shown in FIG. 3, the centers of contact regions of the first elastic lip 32 and the second elastic lip 34 against the main body 14A are represented by P1 and P2, respectively, and the midpoint of the center P1 and the center P2 is represented by P12. When pressing forces F1 and F2 act on the main body 14A at the centers P1 and P2 in the reference direction X, a moment in clockwise direction of FIG. 3 acts on the main body 14A. Accordingly, the cowl louver 12 will attempt to pivot about the pivoting point Pp, which is located at the engagement portion of the projections 22 and 24, in clockwise direction as seen in FIG. 3. In this case, a line Lp connecting the center P12 and the pivoting point Pp will attempt to pivot about the pivoting point Pp in clockwise direction.

Supposing that a foot of a perpendicular drawn from the pivoting point Pp to the centerline Lc of the main body 14A is a reference point Pc, the moment Mp that acts on the cowl louver 12 and urges to move about the pivoting point Pp is considered to be substantially proportional to a moment Mc that is generated by the pressing forces F1 and F2 that urge the main body 14A to pivot about the reference point Pc.

In FIG. 2 and FIG. 3, supposing that a direction perpendicular to the reference direction X is Y direction, and distances between the reference point Pc and the centers P1 and P2 in the Y direction are Ly1 and Ly2, respectively, the moment Mc is represented by the following equation (1).

$$Mc = F1Ly1 - F2Ly2 \qquad (1)$$

If the moment Mc is a positive value, the moment Mc pushes the upper edge 12A of the cowl louver 12 in a direction toward the windshield glass 10 so as to press the upper edge 12A against the interposed portion 18C of the molding 18. Consequently, the pressing forces F1 and F2 and the distances Ly1 and Ly2 are set to values that satisfy the following equation (2) such that the moment Mc becomes a positive value.

$$F1/F2 > Ly2/Ly1 \qquad (2)$$

Ly2/Ly1 is a positive value smaller than 1, since the center P1 is located at a side closer to the tip of the engagement rib 14 than the center P2. Therefore, if the pressing force F1 is equal to or greater than the pressing force F2, the equation (2) above is satisfied regardless of the values of distances Ly1 and Ly2. That is, the upper edge 12A can be surely pressed against the interposed portion 18C of the molding 18 by acting the pressing forces F1 and F2 on the main body 14A of the engagement rib 14, if F1≥F2.

Also, if the pressing force F1 is greater than the pressing force F2, the difference of forces F1−F2 causes the cowl louver 12 to be pushed in the X direction toward the vehicle front side. However, since the second auxiliary rib 14C of the engagement rib 14 is in contact with the inclined surface 26 at the inclined surface 28 thereof in a pressured state, the cowl louver 12 does not move in the X direction toward the vehicle front side, but instead, it is pushed upward and toward the vehicle rear side due to a reaction force acting between the inclined surfaces 26 and 28. This also causes the moment Mc to increase.

As it may be understood from the above-described explanation, according to the first embodiment, the fitting portion 18B of the molding 18 that receives the engagement rib 14 of the cowl louver 12 is provided with the first elastic lip 32 and the second elastic lip 34 on vehicle rear side and vehicle front side, respectively, with respect to the engagement rib 14. The first elastic lip 32 and the second elastic lip 34 extend in the direction the engagement rib 14 extends, that is, in the lateral direction of the vehicle, and are in close contact with the main body 14A of the engagement rib 14 at the tip portions thereof. Further, the first elastic lip 32 and the second elastic lip 34 press on the main body 14A of the engagement rib 14 at a side closer to the tip of the engagement rib 14 than the projections 22 and 24 that function as the slip-out prevention projections, with pressing forces F1 and F2, respectively, and the first elastic lip 32 and the second elastic lip 34 press each other in opposite directions respectively.

Accordingly, even if water enters the fitting portion 18B via the clearance between the fitting portion 18B of the molding 18 and the upper edge 12A of the cowl louver 12, the first elastic lip prevents that water from entering inside the fitting portion 18B via the clearance between the engagement rib 14 and the first elastic lip 32. Also, even if water enters inside the fitting portion 18B via the clearance between the engagement rib 14 and the first elastic lip 32, the second elastic lip prevents that water from entering further inside the fitting portion 18B via the clearance between the engagement rib 14 and the second elastic lip 34.

Further, the first elastic lip 32 and the second elastic lip 34 elastically press on the engagement rib 14 in opposite directions. Therefore, even if dimensional and geometrical tolerances from manufacture and assembly of each member of the connecting structure exist, and even if the geometry and dimensions of each member changes over time, the first elastic lip 32 and the second elastic lip 34 will maintain the state where they are in close contact with the engagement rib 14, whereby exerting their water preventive function by preventing the entry of water via the clearance between the first elastic lip 32 and the second elastic lip 34.

Consequently, entry of water into vehicle interior can be effectively prevented by two elastic lips 32 and 34 without having to provide a sealing member that prevents water from entering the fitting portion 18B via the clearance between the cowl louver 12 and the interposed portion 18C of the molding 18. Also, since a sealing member does not need to be interposed between the cowl louver 12 and the interposed portion 18C, it is possible to reduce the possibility of not being able to properly locate the cowl louver 12 and the windshield glass 10 due to geometrical and dimensional tolerances as well as the compression deformation amount of the sealing member.

Further, the sum of lengths L1 and L2, L1+L2, where L1 and L2 are lengths of the first and second elastic lips 32, 34 protruding from the inner surface of the fitting portion 18B in the reference direction X in their free states, is larger than the value Lx−T obtained by subtracting the thickness T of the engagement rib 14 in the reference direction X from the distance Lx between the inner surfaces of the fitting portion 18B in the reference direction X. Therefore, the first and second elastic lips 32, 24 are compressed in the reference direction X to be elastically deformed, which surely ensures the state where the first and second elastic lips press on the engagement rib 14.

Further, since the first elastic lip 32 presses on the engagement rib 14 at the side closer to the tip of the engagement rib 14 than the second elastic lip 34, the root portion of the engagement rib 14 is subject to a moment in the direction in which the root portion is pushed against the windshield glass 10. Accordingly, the cowl louver 12 is pushed against the windshield glass 10, whereby the possibility of a clearance spreading between the upper edge 12A of the cowl louver 12 and the fitting portion 18B of the molding 18 due to dimensional and geometrical tolerances and the like of the members can be reduced.

Further, positions and strengths of pressing force of the first elastic lip 32 and the second elastic lip 34 when they press on the engagement rib 14 are set so as to correspond to the position and strength of pressing force of the engagement rib 14 at the root portion thereof when it pushes the upper edge 12A of the cowl louver 12 toward the windshield glass 10. Therefore, pressing forces F1 and F2 of the first elastic lip 32 and the second elastic lip 34 surely ensure that the upper edge 12A of the cowl louver 12 is pushed toward the windshield glass 10, and thereby press the upper edge 12A to the fitting portion 18B of the molding 18.

Further, the projections 22 and 24 that function as the slip-out prevention projections are provided on the windshield glass 10 side with respect to the engagement rib 14. Accordingly, the projections 22 and 24 are pressed to each other by the pushing force applied on the upper edge 12A of the cowl louver 12 toward the windshield glass 10. Therefore, even in the case where the clearance between the engagement rib 14 and the fitting portion 18B spreads due to dimensional and geometrical tolerances and the like of each member, the projections 22 and 24 will be maintained in the engaged state, and therefore, the engagement rib 14 can be effectively prevented from slipping out of the fitting portion 18B.

Further, projections similar to the projections 22 and 24 are not provided on the opposite side of the windshield glass 10 with respect to the engagement rib 14. Consequently, the connecting structure 16 can be simplified as compared to the case where the slip-out prevention projections are provided on both sides of the engagement rib 14, and at the same time, the fitting of the engagement rib 14 into the fitting portion 18B during assembly and pulling out of the engagement rib 14 from the fitting portion 18B during disassembly can be performed easily.

Further, in the case where the slip-out prevention projections are provided on both sides of the engagement rib 14, a movable slide, movable in the direction corresponding to the vehicle front side, need to be provided on the forming die of the cowl louver 12, which makes the forming die complex and leads to higher molding costs of the cowl louver 12. On the other hand, according to the first embodiment, since the slip-out prevention projections are not provided on the opposite side of the windshield glass 10 with respect to the engagement rib 14, the forming die can be simplified as compared to the case where the slip-out prevention projections are provided on both sides of the engagement rib 14, reducing the molding cost of the cowl louver 12 thereby.

Further, the first elastic lip 32 and the second elastic lip 34 press on the engagement rib 14 at a side closer to the tip of the engagement rib 14 than the projection 22 and 24. Accordingly, the projections 22 and 24 are not expected to possess the water preventive function, and these projections therefore only need to serve the function of preventing slipping out of the engagement rib 14 from the fitting portion 18B.

Further, the first elastic lip 32 and the second elastic lip 34 do not engage with the projections 22 and 24 when fitting the engagement rib 14 into the fitting portion 18B during assembly of the connecting structure 16 or when pulling out the engagement rib 14 from the fitting portion 18B during disassembly of the connecting structure 16. Consequently, elasticity and rigidity of the first elastic lip 32 and the second elastic lip 34 can be increased to enhance the water preventive function as compared to the case where the first elastic lip 32 and the second elastic lip 34 engage with the slip-out prevention projections and go through an excessive elastic deformation. Also, deterioration of such water preventive function and durability due to elastic deformation of the first elastic lip 32 and the second elastic lip 34 in excess can be avoided.

Also, the first elastic lip 32 and the second elastic lip 34 extend in the W direction, that is, in the direction that the engagement rib 14 extends, and therefore, the first and second elastic lips 32, 34 are in frictional engagement with the engagement rib 14 along the extending direction of the engagement rib 14. Therefore, for example, once the cowl louver 12 and the molding 18 are connected by the engagement rib 14 being fit into the fitting portion 18B, relative displacement of the cowl louver 12 and the molding 18 can be effectively controlled even when a relative force in the lateral direction of the vehicle acts between the cowl louver 12 and the molding 18.

Further, a thickness T of the main body 14A of the engagement rib 14 is constant, and at the side closer to the tip of the main body 14A than the position where the first and second elastic lips 32, 34 press on the engagement rib 14, the main body 14A does not protrude in the direction approaching the inner surface of the fitting portion 18B. Consequently, when fitting the engagement rib 14 into the fitting portion 18B or when pulling out the engagement rib 14 from the fitting portion 18B, as shown by the dashed line in FIG. 1, for example, the first and second elastic lips 32, 34 are not forced to go through elastic deformation by the engagement rib 14 with the force that is larger than the force in the assembled state.

As a result, as compared to the case where the engagement rib 14 has a protrusion, fitting of the engagement rib 14 into the fitting portion 18B during assembly and pulling out of the engagement rib 14 from the fitting portion 18B during disassembly can be performed easily. Also, the possibility of decreasing the pressing force of the first and second elastic lips 32, 34 and deteriorating durability of the first and second elastic lips 32, 34 due to excessive elastic deformation of the first and second elastic lips 32, 34 can be reduced.

Further, the first and second elastic lips 32, 34 are integrally connected to the fitting portion 18B at the respective root portions, and at least one of the first and second elastic lips 32, 34 is, in its free state before the engagement rib 14 is fit into the fitting portion 18B, inclined toward the fitting direction of the engagement rib 14. Consequently, the engagement rib 14 can be easily fitted into the fitting portion 18B as compared to the case where the first and the second elastic lips 32, 34 are not inclined or the case where the first and the second elastic lips 32, 34 are inclined in the opposite direction to the fitting direction of the engagement rib 14. Also, by simply fitting the engagement rib 14 into the fitting portion 18B, the first and second elastic lips 32, 34 can be properly brought into a state where they press on the engagement rib 14 and are in close contact with the engagement rib 14. Further, even if a force in the direction of pulling out the engagement rib 14 from the fitting portion 18B acts on the engagement rib 14, the first and second elastic lips 32, 34 can prevent the engagement rib 14 from being pulled out from the fitting portion 18B due to the friction force therebetween.

Further, the opposing surface 18CS opposing the cowl louver 12 of the interposed portion 18C of the molding 18 is inclined toward the lower edge 10A of the windshield glass 10 as it approaches the outer end of the interposed portion 18C. Still further, the upper edge 12A of the cowl louver 12 has the opposing face 12AS that faces the opposing face 18CS and that is inclined in the same direction as the opposing face 18CS. The opposing face 18CS and the opposing face 12AS overlap each other as seen from the direction perpendicular to the outer face of the upper edge 12A of the cowl louver 12.

Therefore, inside of the fitting portion 18B is not visible even when seen in the direction perpendicular to the outer surface of the upper edge 12A of the cowl louver 12. Accordingly, A estheticity of the connecting structure 16 can be improved as compared to the case where inside of the fitting portion 18B is visible. Also, as compared to the case where the opposing face 18CS and the opposing face 12AS are not inclined in the above-described direction, the direction in which the opposing face 18CS of the cowl louver 12 is pushed against the opposing face 12AS of the interposed portion 18C by pressing forces F1 and F2 of the first and the second elastic lips 32, 34 can be made close to a direction perpendicular to the opposing faces. Accordingly, as compared to the case where the opposing faces 18CS and 12AS of the interposed portion 18C and the cowl louver 12 are not inclined in the above-described direction, the possibility of a clearance spreading between the opposing faces 18CS and 12AS due to dimensional and geometrical tolerances and the like of the members can be effectively reduced.

Further, the cowl louver 12 has a plurality of first auxiliary ribs 14B that extend in the longitudinal direction of the vehicle on the windshield glass 10 side with respect to the engagement rib 14 and that are spaced apart from each other in the lateral direction of the vehicle. The projection 24 that functions as the slip-out prevention projection for the engagement rib 14 is provided on the first auxiliary rib 14B, and is spaced apart from each other in the lateral direction of the vehicle. Therefore, as compared to the case where the slip-out prevention projections are provided on the main body 14A of the engagement rib 14 and extend in the lateral direction of the vehicle, the dimensional and geometrical tolerances necessary for the slip-out prevention projection of the engagement rib 14 can be increased.

Further, the first auxiliary rib 14B has a pinched and pressured portion 38 that is pinched and pressured between the opposing face 18CS of the interposed portion 18C and the opposing face 12AS of the cowl louver 12, and the two opposing faces 18CS and 12AS are spaced apart by the pinched and pressured portion 38. Accordingly, as compared to the case where the upper edge 12A of the cowl louver 12 and the molding 18 come in direct contact, the dimensional and geometrical tolerances necessary for the upper edge 12A of the cowl louver 12 and the molding 18 that come in contact thereto can be increased.

Further, the cowl louver 12 has a plurality of second auxiliary ribs 14C that extend in the longitudinal direction of the vehicle on the opposite side of the windshield glass 10 with respect to the engagement rib 14 and that are spaced apart from each other in the lateral direction of the vehicle. On the tip side opposite from the fixed portion 18A of the fitting portion 18B with respect to the engagement rib 14, the fitting portion 18B is engaged with the inner surface of the cowl louver 12 and the second auxiliary rib 14C.

Consequently, the tip portion of the fitting portion 18B opposite from the fixed portion 18A with respect to the engagement rib 14 is positioned by being engaged with the inner surface of the cowl louver 12 and the second auxiliary rib 14C. As compared to the case where the tip portion of the fitting portion 18B is not engaged with the inner surface of the cowl louver 12 and the second auxiliary rib 14C, the tip portion of the fitting portion 18B can be accurately positioned with respect to the inner surface of the cowl louver 12 and the second auxiliary rib 14C. Therefore, the fitting portion 18B can be accurately positioned with respect to the cowl louver 12 and the engagement rib 14.

Further, the positional relationship between the cowl louver 12 and the molding 18 is determined by engagement of the first auxiliary rib 14B and the second auxiliary rib 14C with the fitting portion 18B and the interposed portion 18C. Accordingly, as compared to the case where the cowl louver 12 and the molding 18 are engaged with each other over a wide range in the vehicle width direction without providing the auxiliary ribs 14B and 14C, for example, positioning of the cowl louver 12 and the molding 18 can be tuned easily.

The above-described operations and effects of the first embodiment can be obtained by first and second modified examples in a similar manner as described hereinafter.

First Modified Example

Figure 4:
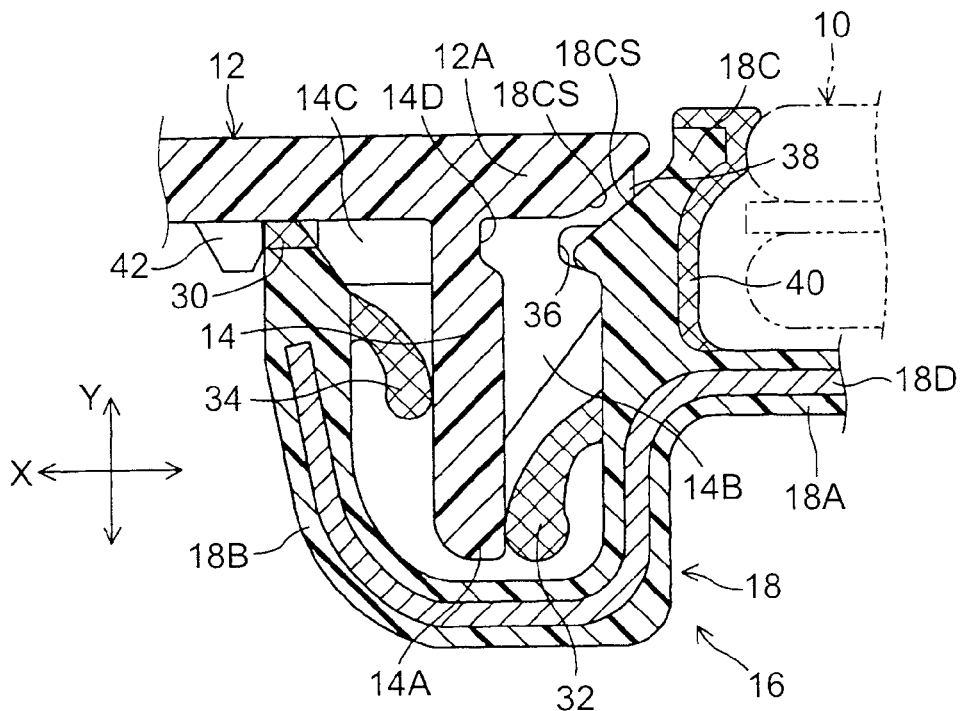
FIG. 4 is a sectional view of main portions of the connecting structure for the windshield glass and the cowl louver according to a first modification example of the present invention, which is a vertical section along a longitudinal direction of a vehicle not shown.

FIG. 4 is a sectional view of main portions of the connecting structure for the windshield glass and the cowl louver according to a first modified example of the present invention, which is a vertical section taken along the longitudinal direction of a vehicle not shown. In FIG. 4, like numerals in FIG. 1 and FIG. 2 denote like elements. The same is true for FIG. 5 described hereinafter.

As shown in FIG. 4, in the first modified example, a stopper 42 is integrally provided on the inner surface of the cowl louver 12 on the opposite side of the engagement rib 14 with respect to the second auxiliary rib 14C at a position spaced therefrom. The stopper 42 is made such that, when the engagement rib 14 is fitted inside the fitting portion 18B up to a predetermined position and the tip portion of the fitting portion 18B on the opposite side of the fixed portion 18A with respect to the engagement rib 14 is engaged with the inner surface of the cowl louver 12 and the second auxiliary rib 14C, it comes into contact with the outer surface of the tip portion. The stopper 42 may also extend in the lateral direction of the vehicle, that is, the W direction, over the entire width of the cowl louver 12, or a plurality of stoppers may be provided at positions that are spaced apart from each other in the lateral direction of the vehicle.

According to the first modified example, it is possible to effectively reduce the possibility of the tip portion of the fitting portion 18B on the opposite side of the fixed portion 18A with respect to the engagement rib 14 from elastically deforming in the direction away from the engagement rib 14, due to the reaction force of the pressing force F1 of the first elastic lip 32 and the pressing force F2 of the second elastic lip 34. Therefore, it is possible to reduce the possibility of the positioning of the tip portion of the fitting portion 18B with respect to the inner surface of the cowl louver 12 and the second auxiliary rib 14C not being properly performed. Accordingly, as compared to the case where the stopper 42 is not provided, the positioning of the molding 18 with respect to the cowl louver 12 can be properly performed and that condition can be maintained.

Second Modified Example

Figure 5:
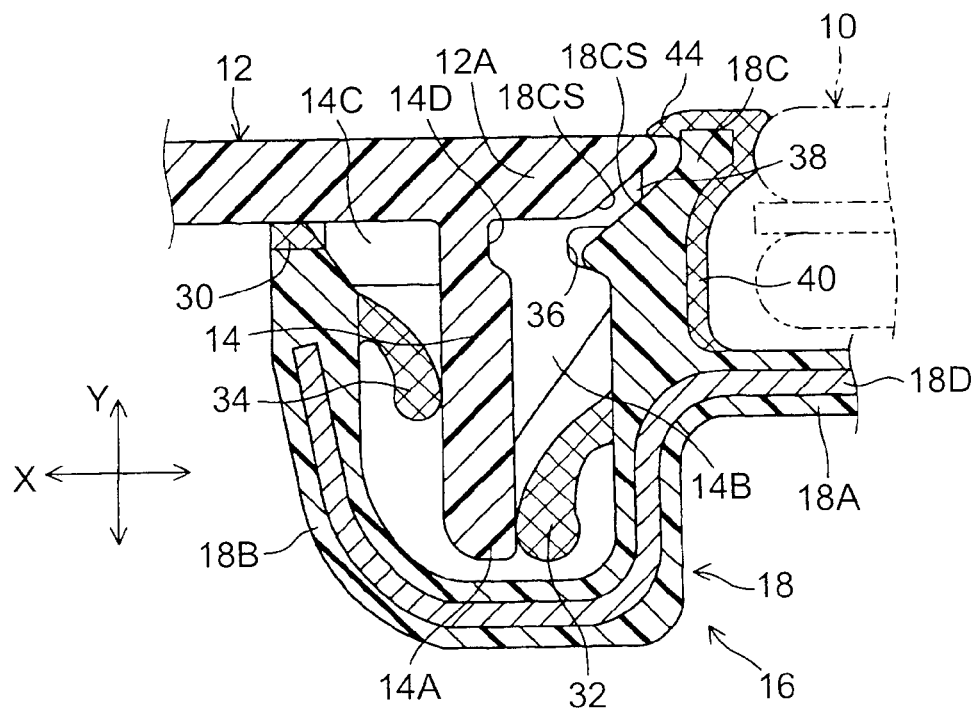
FIG. 5 is a sectional view of main portions of the connecting structure for the windshield glass and the cowl louver according to a second modification example of the present invention, which is a vertical section along a longitudinal direction of a vehicle not shown.

FIG. 5 is a sectional view of main portions of the connecting structure for the windshield glass and the cowl louver according to a second modified example of the present invention, which is a vertical section taken along the longitudinal direction of a vehicle not shown.

As shown in FIG. 5, in the second modified example, the interposed portion 18C of the molding 18 supports the cover 44 at the tip portion thereof. The cover 44 is integrally formed with the soft layer 40 from the same soft material as the soft layer 40. The cover 44 protrudes from the tip portion of the interposed portion 18C toward the upper edge 12A of the cowl louver 12, and extends over the entire width of the molding 18. Also, the cover 44 comes into contact, at the tip portion thereof, with the outer surface of the upper edge 12A of the cowl louver 12. Consequently, the cover 44 is elastically deformed downward by the upper edge 12A of the cowl louver 12 when the engagement rib 14 is fit into the fitting portion 18B, but it restores its state as shown in FIG. 5 by elasticity once the engagement rib 14 is fitted into a predetermined position.

According to the second modified example, the possibility of dust and water entering inside the fitting portion 18B via the clearance between the opposing face 12AS of the upper edge 12A of the cowl louver 12 and the opposing face 18CS of the interposed portion 18C of the molding 18 can be reduced. Further, since the first elastic lip 32 and the second elastic lip 34 prevent the entry of water into the vehicle interior, the cover 44 does not need to be interposed between the opposing face 12AS and the opposing face 18CS in a compressed state, as in the case of a sealing member. Accordingly, the cover 44 does not inhibit positioning to each other of the cowl louver 12 and the molding 18.

According to the illustrated second modified example, the cover 44 is integrally formed with the soft layer 40 by the same soft material as the soft layer 40, however, it may be formed of other resilient material different from the one used in the soft layer 40, or may be formed separately from the soft layer 40.

Also, a cover similar to the cover 44 may be provided integrally with the upper edge 12A of the cowl louver 12 in place of the cover 44, and arranged so that the tip portion of the cover is in contact with the outer surface (in the case where the soft layer 40 forms the outer surface, that outer surface) of the interposed portion 18C of the molding 18. According to this modified example, the cover 44 is not elastically deformed by the outer end portion of the interposed portion 18C of the molding 18 even when the engagement rib 14 is fit into the fitting portion 18B.

In the foregoing, explanation has been given in detail based on specific embodiments of the present invention, however, the present invention is not limited to the above-mentioned embodiments, and therefore shall be obvious to those skilled in the art that various other embodiments are possible within the scope of the present invention.

For example, in the above-mentioned embodiment and modified examples, the thickness T of the main body 14A of the engagement rib 14 in the X direction is constant, however, the thickness T does not need to be constant. For example, the thickness T of the main body 14A may be gradually decreased toward the tip of the main body 14A, or instead, the surfaces of the first elastic lip 32 and the second elastic lip 34 may protrude in the reference direction X at a position on the root side than where the first elastic lip 32 and the second elastic lip 34 contact the main body 14A.

Also, in the above-mentioned embodiment and modified examples, the projection 24 is provided on the first auxiliary rib 14B, however, the first auxiliary rib 14B may be omitted. In that case, the root portion of the main body 14A of the engagement rib 14 may be expanded to the windshield glass 10 side such that a projection similar to the projection 24 may be provided thereon. Also, in the case of omitting the first auxiliary rib 14B, a pinched and pressured portion similar to the pinched and pressured portion 38 may be provided on the interposed portion 18C of the molding 18.

Also, in the above-mentioned embodiment and modified examples, the opposing face 12AS of the upper edge 12A of the cowl louver 12 and the opposing face 18CS of the interposed portion 18C are maintained in state where they are spaced apart from each other by a pinched and pressured portion 38 that forms a part of the first auxiliary rib 14B. However, the upper edge 12A of the cowl louver 12 and the interposed portion 18C may be in contact with each other at a portion thereof.

Further, in the above-mentioned embodiment and modified examples, the opposing faces 12AS and 18CS are inclined parallel to each other toward the lower edge 10A of the windshield glass 10 as the opposing faces 12AS and 18CS approaches toward the outer end of the interposed portion 18C. However, these opposing faces do not need to be parallel to each other or be inclined. Also, a sealing member may be interposed between the opposing faces 12AS and 18CS.

In the above-mentioned embodiment and modified examples, the first elastic lip 32 and the second elastic lip 34 are inclined such that the tips thereof are located below the roots thereof even in their free states before the engagement rib 14 is fit into the fitting portion 18B. However, the first and second elastic lips 32, 34 do not need to be inclined downward in their free states.

Also, in the above-mentioned embodiment and modified examples, the tip of the inserted body 18D at the tip portion of the fitting portion 18B of the molding 18 is located below the root portion of the second elastic lip 34. However, the tip of the inserted body 18D may be modified, as shown by an imaginary line in FIG. 2, such that it is located above the root portion of the second elastic lip 34, so as to effectively support the reaction force of the pressing force F2 of the second elastic lip 34 and to control deformation of the tip portion of the fitting portion 18B due to expansion.

The invention claimed is:

1. A connecting structure for a windshield glass and a cowl louver, comprising:
 a molding having a fixed portion that is fixed on an inner surface of a lower edge of the windshield glass, and a fitting portion that receives an engagement rib that protrudes downward from a location near an upper edge of the cowl louver and that extends along the upper edge, wherein
 the engagement rib and the fitting portion include slip-out prevention projections that prevent the engagement rib from slipping out of the fitting portion by cooperation of the slip-out prevention projections,
 the molding has a first elastic lip that is supported by the fitting portion on a windshield glass side with respect to the engagement rib, and a second elastic lip that is supported by the fitting portion on an opposite side of the first elastic lip with respect to the engagement rib,
 the first and second elastic lips press on the engagement rib at a side closer to a tip of the engagement rib than the slip-out prevention projections, and the first and second elastic lips press each other in opposite directions, and
 the cowl louver has a plurality of first auxiliary ribs that extend in a longitudinal direction of a vehicle on the windshield glass side with respect to the engagement rib.

2. The connecting structure for the windshield glass and the cowl louver according to claim 1, wherein
 a reference direction is a direction perpendicular to a protrusion direction and an extending direction of the engagement rib, the sum of lengths of the first and second elastic lips protruding from inner surfaces of the fitting portion in the reference direction, in a free state before the engagement rib is fit to the fitting portion, is greater than a value obtained by subtracting a thickness of the engagement rib in the reference direction from a distance between the inner surfaces of the fitting portion in the reference direction.

3. The connecting structure for the windshield glass and the cowl louver according to claim 2, wherein
 in a sectional view taken along a longitudinal direction of the vehicle, the cowl louver is relatively pivotable, with respect to the molding, about a pivoting point that is located at a part where the slip-out prevention projections of the engagement rib and the fitting portion are engaged with each other,
 a reference point is a foot of a perpendicular drawn from the pivoting point to a centerline of the engagement rib, a first distance and a second distance are distances from the reference point to positions where the first and second elastic lips press on the engagement rib, the first distance and the second distance are expressed in terms of a distance in a protruding direction of the engagement rib,
 pressing forces of the first and second elastic lips pressing on the engagement rib are represented by a first pressing force and a second pressing force, and
 a ratio of the first pressing force to the second pressing force is greater than the ratio of the second distance to the first distance.

4. The connecting structure for the windshield glass and the cowl louver according to claim 2, wherein
 the slip-out prevention projections of the engagement rib and the fitting portion are provided on the windshield glass side with respect to the engagement rib.

5. The connecting structure for the windshield glass and the cowl louver according to claim 1, wherein
 a position where the first elastic lip presses on the engagement rib is on a side closer to the tip of the engagement rib than a position where the second elastic lip presses on the engagement rib.

6. The connecting structure for the windshield glass and the cowl louver according to claim 1, wherein
 the first and second elastic lips extend in a extending direction of the engagement rib.

7. The connecting structure for the windshield glass and the cowl louver according to claim 1, wherein
 the engagement rib does not protrude in a direction approaching the inner surface of the fitting portion on the side closer to the tip of the engagement rib than a position where the first elastic lip presses on the engagement rib, and
 the engagement rib does not protrude in a direction approaching the inner surface of the fitting portion on the side closer to the tip of the engagement rib than a position where the second elastic lip press on the engagement rib.

8. The connecting structure for the windshield glass and the cowl louver according to claim 7, wherein
a thickness of a main body of the engagement rib gradually decreases toward the tip of the engagement rib.

9. The connecting structure for the windshield glass and the cowl louver according to claim 1, wherein
the first and second elastic lips are integrally connected to the fitting portion at respective root portions, and
at least one of the first and second elastic lips, in a free state before the engagement rib is fit to the fitting portion, is inclined downward.

10. The connecting structure for the windshield glass and the cowl louver according to claim 1, wherein
the molding has an interposed portion that is interposed between the lower edge of the windshield glass and the upper edge of the cowl louver,
an opposing face of the interposed portion that opposes the cowl louver of the interposed portion is inclined toward the lower edge of the windshield glass as it approaches an outer end of the interposed portion,
the upper edge of the cowl louver has an opposing face of the cowl louver that opposes the opposing face of the interposed portion and that is inclined in the same direction as the opposing face of the interposed portion, and
the opposing face of the interposed portion and the opposing face of the cowl louver overlap each other as seen from the direction perpendicular to an outer face of the upper edge of the cowl louver.

11. The connecting structure for the windshield glass and the cowl louver according to claim 1, wherein
a said slip-out prevention projection for the engagement rib is provided on one of the plurality of first auxiliary ribs.

12. The connecting structure for the windshield glass and the cowl louver according to claim 10, wherein
the first auxiliary ribs have a pinched and pressured portion that is pinched and pressured between the opposing face of the interposed portion and the opposing face of the cowl louver.

13. The connecting structure for the windshield glass and the cowl louver according to claim 1, wherein
the cowl louver has a plurality of second auxiliary ribs that extend in a longitudinal direction of the vehicle on the opposite side of the windshield glass with respect to the engagement rib, and
the fitting portion is engaged with the inner surface of the cowl louver and the second auxiliary ribs at a tip portion of the fitting portion on the opposite side of the fixed portion with respect to the engagement rib.

14. The connecting structure for the windshield glass and the cowl louver according to claim 13, wherein
the engagement rib and a stopper integrally provided on the inner surface of the cowl louver are on opposite sides of the second auxiliary ribs, the stopper being at a location spaced from the second auxiliary ribs.

15. The connecting structure for the windshield glass and the cowl louver according to claim 10, wherein
the interposed portion of the molding supports a cover at a tip portion of the interposed portion,
the cover protrudes from the tip portion of the interposed portion toward the upper edge of the cowl louver and extends along an entire width of the molding, and
the cover is in contact with an outer surface of the upper edge of the cowl louver at a tip portion of the cover.

* * * * *